(12) United States Patent
Gehre (10) Patent No.: US 11,757,274 B2
(45) Date of Patent: Sep. 12, 2023

(54) METHOD FOR PRODUCING A PRE-ASSEMBLED INTEGRALLY PRODUCED CABLE GLAND

(71) Applicant: WISKA HOPPMANN GMBH, Kaltenkirchen (DE)

(72) Inventor: Peter Gehre, Kaltenkirchen (DE)

(73) Assignee: WISKA HOPPMANN GMBH, Kaltenkirchen (DE)

( * ) Notice: Subject to any disclaimer, the term of this patent is extended or adjusted under 35 U.S.C. 154(b) by 269 days.

(21) Appl. No.: 17/342,586

(22) Filed: Jun. 9, 2021

(65) Prior Publication Data
US 2021/0296879 A1 Sep. 23, 2021

Related U.S. Application Data

(62) Division of application No. 16/693,618, filed on Nov. 25, 2019, now abandoned.

(30) Foreign Application Priority Data

Nov. 28, 2018 (EP) ..................................... 18208917

(51) Int. Cl.
| | |
|---|---|
| *B29C 45/14* | (2006.01) |
| *H02G 15/04* | (2006.01) |
| *B29C 45/16* | (2006.01) |
| *B29C 45/00* | (2006.01) |

(52) U.S. Cl.
CPC ....... *H02G 15/043* (2013.01); *B29C 45/0017* (2013.01); *B29C 45/14754* (2013.01); *B29C 45/16* (2013.01); *B29C 2045/1601* (2013.01)

(58) Field of Classification Search
CPC .............. B29C 45/14754; B29C 45/16; B29C 45/0017; B29C 2045/1601
See application file for complete search history.

(56) References Cited

U.S. PATENT DOCUMENTS

| | | | |
|---|---|---|---|
| 3,281,295 A | * | 10/1966 | Capucio ................. B29D 23/20 215/44 |
| 4,358,079 A | | 11/1982 | Navarro |
| 4,983,784 A | | 1/1991 | Whitlock |
| 5,589,663 A | | 12/1996 | Wales |

(Continued)

FOREIGN PATENT DOCUMENTS

| | | |
|---|---|---|
| CN | 101080853 | 11/2007 |
| CN | 102823093 | 12/2012 |

(Continued)

*Primary Examiner* — Edmund H Lee
(74) *Attorney, Agent, or Firm* — PRICE HENEVELD LLP (57) ABSTRACT

Cable gland for guiding a cable through a wall opening, comprising a body element extending along a longitudinal axis and having an internal cable duct extending along the longitudinal axis, a clamping portion arranged on the body element and having a plurality of clamping elements, a tubular sealing element arranged inside the cable duct and connected to the body element, and a cap nut having an axial opening at one end which is mechanically coupled with the body element, wherein the body element is formed from a first material and the cap nut is formed from a second material, wherein the first material and the second material are injection moulded on to one another.

23 Claims, 8 Drawing Sheets

(56) References Cited

U.S. PATENT DOCUMENTS

| | | | |
|---|---|---|---|
| 5,705,112 A | * | 1/1998 | Gram .................. B29C 45/1635 425/576 |
| 5,866,853 A | | 2/1999 | Sheehan |
| 6,488,317 B1 | | 12/2002 | Daoud |
| 8,657,626 B2 | | 2/2014 | Duval et al. |
| 9,640,965 B1 | | 5/2017 | Long et al. |
| 10,840,685 B2 | | 11/2020 | Lee et al. |
| 2011/0226084 A1 | | 9/2011 | Chiou |
| 2012/0142207 A1 | | 6/2012 | Duval et al. |
| 2014/0030903 A1 | | 1/2014 | Magno et al. |

FOREIGN PATENT DOCUMENTS

| | | | |
|---|---|---|---|
| DE | 202009007433 | | 8/2009 |
| DE | 202018106798 | * | 3/2020 |
| EP | 2793334 | | 10/2014 |
| EP | 2902827 | * | 8/2015 |
| GB | 2135137 | * | 8/1984 |
| GB | 2224894 | | 5/1990 |
| GB | 2250644 | * | 6/1992 |

* cited by examiner

METHOD FOR PRODUCING A PRE-ASSEMBLED INTEGRALLY PRODUCED CABLE GLAND

CROSS-REFERENCE TO FOREIGN PRIORITY APPLICATION AND CLAIM OF PRIORITY

The present application is a divisional application of commonly assigned, U.S. patent application Ser. No. 16/693,618 filed Nov. 25, 2019, now abandoned, which claims the benefit under 35 U.S.C. §§ 119(b), 119(e), 120, and/or 365(c) of EP 18208917.7 filed Nov. 28, 2018.

FIELD OF THE INVENTION

The invention relates to a cable gland for guiding a cable through a wall opening, having a body element, a clamping portion, and a cap nut. The invention relates further to a method for producing a cable gland.

BACKGROUND OF THE INVENTION

Cable glands are used, in particular, for guiding an electrical line through a wall opening, for example, a housing wall opening or a switch cabinet wall opening. Cable glands serve, in particular, to fix the electrical lines axially in their longitudinal direction in the cable gland by clamping, and thus to achieve strain relief. The electrical lines can further be protected from damage by relative movements at edges of the wall opening during operation. It is, therefore, desirable that the cable gland reliably clamps the cable guided through the wall opening and relieves it from strain.

Cable glands of the type mentioned at the beginning can have additional functions. In particular, cable glands often have a sealing function. A line is thereby sealed inside the cable gland against moisture ingress and, optionally, gas ingress. Furthermore, a function can be provided which provides earthing of a shielded line via the cable gland in that an electrical contact of a shielding braid of a line with the wall in which the wall opening is formed is established by the cable gland.

Cable glands are used in large numbers in many applications and, as mass-produced products, are, therefore, subject to high pricing pressure, resulting in the search for an inexpensive manufacturing method. Therefore, savings are sought both in terms of material costs and in terms of manufacturing costs. In addition to this requirement for manufacture that is as simple and inexpensive as possible, it is, however, further desirable that cable glands can be installed as quickly and accurately as possible by the user, that is to say, the installer. This means that neither faulty installation, for example, as a result of a combination of unsuitable parts or incorrect alignment/location/tightening of the parts, nor a time-consuming selection of the correct parts is desirable. This search for high functionality in terms of installation usually stands in the way of the search for production-oriented manufacture.

SUMMARY OF THE INVENTION

The object underlying the invention is, therefore, to provide a cable gland which increases the functionality in terms of installation without increasing the costs of manufacture, and which at the same time permits clamping and strain relief of a cable that continues to be reliable in the long term.

According to a first aspect of the present invention, this object is achieved by a cable gland for guiding a cable through a wall opening, comprising a body element extending along a longitudinal axis and having an internal cable duct extending along the longitudinal axis, a clamping portion having a plurality of clamping elements which are movable from a first position, in which the clamping elements delimit a first inside diameter, into a second position, in which the clamping elements delimit a second inside diameter which is different from the first inside diameter, preferably smaller than the first inside diameter, wherein the clamping portion is arranged on the body element, and a cap nut having an axial opening at one end which is mechanically coupled with the body element, wherein the cap nut is movable from a first position on the body element into a second position on the body element, wherein the body element is formed from a first material and the cap nut is formed from a second material, wherein the first material and the second material are injection moulded on to one another.

According to the invention, the cable gland can preferably additionally have a tubular sealing element which is arranged inside the cable duct on the body element and is connected to the body element. It is further preferred if the clamping portion and the body element are integrally formed from the first material.

The invention is based inter alia on the finding that the pre-assembly of the individual parts of a cable gland as a whole, which is often carried out, and the marketing of cable glands in such a form, or at least the taking of cable glands so pre-assembled to the installation site, simplifies the installation of the cable gland itself in the housing and to the cable. However, additional time is thereby required for pre-assembly.

The components of such cable glands, that is to say, the body element, the clamping portion, the cap nut, and optionally the sealing element, can be manufactured individually in high quality and assembled manually. Nevertheless, the step of manual assembly entails higher costs because of the associated employment of personnel and time.

In principle, the invention is based on the finding that a pre-assembled state can also be achieved by assembling the components of the cable gland in such a manner that they are fastened to one another without a clamping action of the clamping elements already being achieved. According to the invention, the cap nut accordingly does not have to be removed again partially or completely from the pre-assembled position but remains fastened in a position on the body element in which it does not cooperate with the clamping elements to clamp the cable. The clamping elements can thus preferably be in a relaxed state.

In the solution described herein, the cable gland can be integrally manufactured. The body element, the cap nut, and preferably the clamping portion having the clamping elements are thereby manufactured in the pre-assembled state by means of an injection moulding operation in a tool.

Optionally, the sealing element can preferably already be connected to the body element by the injection moulding operation. The sealing element can preferably be connected to the body element by an interlocking, friction-based, and/or material-bonded connection.

The cap nut of the second material is in such a form that it is mechanically coupled to the body element, that is to say fastened to the body element, and is movable on the body element. The cap nut is also manufactured according to the invention in the same manufacturing operation and thus preferably injection moulded. The body element can thereby serve as a portion of the mould in which the cap nut is manufactured or, vice versa, the cap nut can serve as a portion of the mould in which the body element is manufactured. This is dependent on the manufacturing sequence. The manufacturing process results in a body element and cap nut which are directly connected to one another and thus pre-assembled. The particular feature is that the cap nut is movable on the body element, despite the fact that they are manufactured directly on one another, in order to be able to be moved from the first position into the second position or vice versa.

According to the invention, the cap nut and the body element are thus injection moulded onto one another without a connection being produced between those components that prevents that relative movability. As a result, separate components of the cable gland can be produced in a single manufacturing process and an outlay in terms of time can thereby be significantly reduced. In addition, the manufacture of these separate components in the pre-assembled state has the result that the step of manual assembly of the components is omitted and the outlay in terms of personnel can thus also be reduced significantly.

The movability can be achieved, in particular, in that the body element and the cap nut are in contact in the region of a thread, a catch means, a bayonet coupling, or the like and consequently one side of the thread, catch means, or bayonet on the body element or cap nut serves to shape the other, cooperating part of the thread, catch mechanism, or bayonet on the cap nut or the corresponding body element. After manufacture, the cap nut and the body element are removed together and in pre-assembled form from the tool mould and are movable relative to one another between the first and second position.

The avoidance of a connection between the cap nut and the body element, which is necessary for the relative movability, can be achieved by manufacturing-related parameters or the choice of material or a combination thereof. Thus, for example, one material can have a lower melting point than the other material, in order to avoid fusion of the shaping part. Furthermore, separation of the two parts can be effected by shrinkage effects, for example, in that a part on the outside shrinks less than a part on the inside, so that a gap forms between the parts when they shrink. Further, parameters such as injection pressure, after-pressure, moulding temperature, or injection temperature can influence desired effects, such as shrinkage and temperature of the melt, when the two parts come together at their shaping boundary surface.

It is also advantageous that integral manufacture by injection moulding has the result that a connection between the separate components can be formed particularly accurately. In particular, a connection side of the cap nut and a connection side of the body element can have corresponding means which are formed by the injection moulding of the materials on to one another. As a result of the particularly accurate form of the connection, reliable clamping and strain relief can be achieved. In addition, installation of the cable gland can thereby also be facilitated.

A body element can preferably be understood as being an elongate hollow body having the longitudinal axis. Preferably, the length of the body element can be greater than a diameter of the body element. In particular, it is preferred to manufacture the body element to be relatively rigid, preferably dimensionally stable.

By means of the sealing element, the cable can be sealed within the cable gland. It can thereby preferably be understood that the cable, which is to be guided through the wall opening in a strain-relieved and sealed manner by the cable gland, runs inside the tubular sealing element. The sealing element can preferably be pressed against the outer surface of the cable by the clamping of the cable inside the cable duct. The sealing action can thereby be achieved.

In the relaxed state, that is to say in the first position, the clamping elements can preferably extend in the axial direction from the body element. In particular, the clamping elements can extend in the axial direction radially outwards from the body element. The clamping elements can thereby be in the form of a type of web. The clamping elements can preferably have a thickened portion in the radial direction. The clamping elements can thus be in the form of webs which are approximately triangular in cross section. Preferably, the clamping elements can be arranged in the circumferential direction alternately with a tip located on the inside and a base located on the inside.

In a relaxed state in the first position, in which the clamping elements do not have a clamping action, the clamping elements, or optionally the thickened portion, can preferably delimit the first inside diameter, which is larger than the second inside diameter which is delimited by the clamping elements, or optionally the thickened portion, in the second position. The clamping elements can preferably be configured to be movable, preferably tiltable, radially, preferably axially-radially. In particular, the clamping elements can be moved, preferably tilted, radially inwards by moving the cap nut from the first position into the second position on the body element, in order to achieve a clamping action.

Alternatively, the clamping elements in the first position can extend radially inwards, preferably in the axial direction radially inwards, form the body element. The clamping elements can thereby be moved, preferably tilted, radially outwards in the axial direction preferably from the first position into the second position by introducing a cable. The first inside diameter, which is delimited by the clamping elements in the first position, can preferably be smaller than the second inside diameter, which is delimited by the clamping elements in the second position. The clamping action can thereby preferably be effected by a diameter of the cable itself.

Where reference is made to outwards and/or inwards, these directions refer to the body element, in particular, the cable duct formed by the body element, or the longitudinal axis. Accordingly, inwards is to be understood as being a direction into the cable duct, that is to say, preferably in the direction of the longitudinal axis, starting from the body element. Correspondingly, outwards is to be understood as meaning a direction outwards, that is to say, away from the longitudinal axis, starting from the body element.

A cap nut can preferably be understood as being an element which is in the form of a hollow body and has locking means, preferably friction-based and/or interlocking locking means, on an inner circumference. The locking means can preferably be formed to lock the cap nut on the body element in the second position by an interlocking and/or friction-based connection. The locking means can preferably be in the form of an internal thread and/or a latching means and/or the like. The term cap nut is not to imply a limitation to an element that is configured only for screwing.

Preferably, the clamping portion can be formed, in particular, injection moulded, from the first material, and the cap nut can be injection moulded from the second material on to the body element. In particular, the clamping portion and the body element can be integrally formed from the first material.

Alternatively, preferably the cap nut can be formed, in particular, injection moulded, from the second material, and the clamping portion can be injection moulded from the first material onto the cap nut. In particular, the clamping portion and the body element can be integrally formed from the first material and injection moulded on to the cap nut.

It is particularly preferred if the first material corresponds to the second material and separation of the cap nut from the body element and optionally the clamping portion takes place preferably by the application of force. A predetermined breaking point can thereby preferably be provided at the connection between the cap nut and the body element and/or the clamping portion.

Preferably, separation of the cap nut from the body element and/or the clamping portion can take place by injection moulding the second component, that is to say, the cap nut or the body element, and optionally the clamping portion, with a temperature that does not melt the material of the first component, so that no material-bonded connection forms. To this end, a first material and a second material having different melting points can preferably be chosen.

Alternatively, preferably the first material and the second material can be different materials and/or comprise different material components and be designed to permit separation between the cap nut and the body element or optionally the clamping portion.

It is particularly preferred that the first material and the second material are plastics materials.

Preferably, the first material can be a rigid plastics material and, in particular, polypropylene and/or polyamide and/or polycarbonate and/or polyvinyl chloride and/or polyethylene and/or any other thermoplastic plastic. Alternatively, the first material can comprise a rigid plastics material, in particular, polypropylene and/or polyamide and/or polycarbonate and/or polyvinyl chloride and/or polyethylene and/or any other thermoplastic plastic.

According to a first preferred embodiment, the first material has a first shrinkage and the second material has a second shrinkage which is less than the first shrinkage.

Shrinkage can preferably be understood as meaning a physical process which can start on cooling of an injection-moulded material. Shrinkage can preferably also occur as a result of drying or of chemical or physical conversion mechanisms in the material. Parameters such as the volume and size of the component injection moulded from the material can thereby preferably be reduced. This reduction can preferably take place without removing a material or exerting pressure. The reduction, that is to say, the shrinkage, represents a specific characteristic parameter of the material used and can preferably be indicated as a percentage.

Shrinkage can preferably take place in two stages. Shrinkage can preferably be composed of processing shrinkage, which takes place immediately during or after injection moulding, and after-shrinkage. Alternatively, the shrinkage of the first material and/or of the second material that occurs can correspond to processing shrinkage or after-shrinkage. After-shrinkage can take place preferably as a result of post-crystallization and/or in a structural entropy-marked realignment of the molecule chains of the material as a result of reorientations. Furthermore, demoulding shrinkage can preferably occur as a result of volume contraction.

In principle, the shrinkage can be influenced by different factors and parameters. For example, the material used, a temperature of the liquid material on injection or the temperature in the injection moulding tool, an injection pressure, a post-pressure, and an ambient temperature on cooling of the material as well as the cooling time can influence the shrinkage. Preferably, the component itself can also have an influence on the shrinkage. In particular, a size, a complexity of the component, and the wall thicknesses can play a part here. Further preferably, a design and marking of the injection moulding tool, in particular, a temperature balance of the injection moulding tool and optionally a length and type of the gate, can likewise influence the shrinkage.

In particular, where conditions and parameters are otherwise constant, the shrinkage can preferably be influenced by the choice of material. The reason for this can, in particular, be a chemical composition of the material—in particular, amorphous or semi-crystalline materials—and a morphology that is established. Different materials, in particular, different plastics, react differently to the influences and parameters of the injection moulding process.

The shrinkage can preferably also be influenced by reinforcing fibres and/or filler components. By enriching the material with reinforcing fibres and/or filler component, the shrinkage can preferably be reduced. For example, the material properties can be changed, in particular stability increased, by means of glass fibres, and shrinkage can be reduced while the parameters of the injection moulding process otherwise remain the same. As further examples of reinforcing fibres and/or filler components, glass spheres or talcum can preferably be mentioned. Furthermore, the shrinkage can preferably be influenced by the addition of nucleating agents and/or colouring pigments.

It is, therefore, particularly preferred if the second material comprises reinforcing fibres and/or filler components. The second material can preferably additionally also comprise polypropylene and/or polyamide and/or polycarbonate and/or polyvinyl chloride and/or polyethylene and/or any other thermoplastic plastic, preferably the first material. By means of this form, the shrinkage of the second material can be reduced.

In particular, it is preferred that the shrinkage of the first material and/or of the second material that occurs is sufficient to achieve separation of the first material and the second material from one another. Accordingly, a material-bonded connection between the first material and the second material is preferably to be avoided by different free shrinkage of the first material and the second material. Substantially simultaneous manufacture of the separate components in one manufacturing process can thereby preferably be made possible. At the same time, it is preferred that the shrinkage is sufficiently low that it does not adversely affect the dimensional stability and surface quality of the component that is to be produced. Accordingly, despite shrinkage, it is nevertheless possible to produce components, that is to say, the cap nut and the body element as well as the clamping portion, having high dimensional stability and surface quality. Owing to this form, reliable clamping and strain relief can be achieved while, at the same time, the manufacturing costs are reduced.

For example, the first material can be an amorphous plastics material and the second material can be a semi-crystalline plastics material. In semi-crystalline plastics materials, the shrinkage can depend significantly on the degree of crystallinity and the temperature gradient or profile in the injection moulding tool. Amorphous plastics materials can preferably have a shrinkage of approximately from 0.2% to 0.8%. By contrast, semi-crystalline plastics materials can preferably have a shrinkage of approximately from 0.4% to 5%. The shrinkage of the amorphous plastics material can thereby preferably correspond to the processing shrinkage.

The shrinkage of the semi-crystalline plastics material can preferably be composed of processing shrinkage and after-shrinkage. Owing to the fact that after-shrinkage preferably occurs only in the case of the semi-crystalline plastics material, that is to say the second material, the cap nut can be separated from the body element and the clamping portion.

According to a further preferred development of the cable gland, play occurs at a connection between the cap nut and the body element. Play can preferably be understood as meaning that two components which are mutually engaging or arranged side-by-side have a freedom of movement, that is to say, are preferably freely movable and at the same time fastened to one another. It can be provided, in particular, that the play between the cap nut and the body element occurs only in the first position, and the cap nut and the body element can be fastened to one another by an interlocking and/or friction-based connection in the second position. Reliable clamping and strain relief can thereby be made possible.

Preferably, the sealing element can be formed from a third material. The third material can preferably be different from the first and/or second material.

In particular, it is preferred that the sealing element, preferably of the third material, is connected to the body element and/or the clamping portion by a material-bonded connection. In this form, the sealing element is connected to the body element and/or the clamping portion and thereby forms an integral component with the body element and/or the clamping portion. As a result, on the one hand, installation can be facilitated because, for example, slipping of the sealing element can be avoided. Furthermore, the manufacturing costs can thereby be reduced further, since a smaller number of components must be kept ready, combined with one another, and assembled.

Preferably, the sealing element can be provided and the body element and/or the clamping portion can be injection moulded onto the sealing element, so that a material-bonded connection is formed.

In particular, it is preferred that the sealing element is injection moulded onto the body element and/or the clamping portion. By means of this form, an integral form of the body element, clamping portion, and sealing element is provided, which at the same time achieves lower manufacturing costs and advantageous material properties.

A further preferred embodiment provides that the cable gland further comprises a tubular sealing element which is arranged inside the cable duct on the body element and is connected to the body element, wherein the sealing element is formed from a third material, wherein the sealing element is injection moulded onto the body element and is connected to the body element by a material-bonded connection.

Preferably, the sealing element can be provided, in particular, in finished form, and the body element can be injection moulded onto the sealing element.

It is yet further preferred that the third material has a lower modulus of elasticity than the first material and/or the second material. In particular, it is preferred if the sealing element is formed of a plastics material having a higher elasticity, for example, an elastomer. In particular, silicone-based or polyurethane-based, in particular, rubber-elastic plastics materials can be used. By means of this form, particularly reliable sealing of the cable in the cable duct can be achieved.

According to a further preferred development of the cable gland, it is provided that a portion of the body element has an outer side which serves to shape an inner side of a portion of the cap nut, or a portion of the cap nut has an inner side which serves to shape an outer side of a portion of the body element. According to this development, a first component, that is to say, the cap nut or the body element and the clamping portion, can preferably be injection moulded first, and its form, in particular, its shaping, can be used to form, in particular, shape, a second component, that is to say, the body element and the corresponding clamping portion or the cap nut. By injection moulding the second component onto the first component, the second component can be manufactured corresponding to the shape of the first component. A particularly accurately fitting connection between these components can thereby preferably be achieved.

According to this development, the cable gland can preferably be converted from the pre-assembled state into the assembled state by screwing on the cap nut.

In particular, it is preferred that locking means are formed in each case on the portion of the outer side of the body element and on the portion of the inner side of the cap nut, which locking means can be brought into engagement with one another. These locking means are preferably configured to lock the cap nut in the second position on the body element.

These locking means can preferably be in the form of interlocking and/or friction-based locking means. By means of such locking means, inadvertent loosening of a clamping action and strain relief of the cable can preferably be avoided.

It is particularly preferred that the outer side of the portion of the body element is in the form of an external thread and the inner side of the portion of the cap nut is in the form of an internal thread, wherein the external thread of the body element and the internal thread of the cap nut are brought into engagement, wherein the internal thread of the cap nut is connected in the second position to the external thread of the body element by an interlocking and/or friction-based connection, wherein the internal thread of the cap nut is preferably left-handed.

As a result of this form of the outer side of the portion of the body element and the inner side of the portion of the cap nut, the external thread can be formed on the internal thread or the internal thread can be formed on the external thread. A particularly simple and exact form of the external thread and of the internal thread can thereby be achieved.

The external thread and the internal thread can preferably be configured to be self-locking. A self-locking thread can have a thread pitch which prevents unintentional detachment of the cap nut from the body element.

In particular, it is preferred that the cap nut has a left-handed internal thread. In this form, the cap nut can be located in the first position on the body element and, by screwing with a customary turning movement, can be moved in the direction of the clamping portion into the second position on the body element.

It is particularly preferred that the body element has a fastening flange, wherein the cap nut in the first position rests on the fastening flange and is movable away from the fastening flange from the first position into the second position, wherein the cap nut has a clamping surface which cooperates with the clamping elements and in the second position presses the clamping elements into the second position, wherein the clamping elements in the second position delimit the second inside diameter, which is smaller than the first inside diameter.

The movement away from the fastening flange thereby describes the movement of the cap nut on the body element in the direction towards the clamping portion. Accordingly, it is particularly advantageous to make the internal thread of the cap nut left-handed, in order to permit clamping of the clamping elements by a customary turning movement. Particularly simple fitting can thus be carried out in the customary manner.

Alternatively, the internal thread of the cap nut can also be configured to be right-handed. By screwing the cap nut from the first position into the second position, the radially inwardly directed movement of the clamping elements can be brought about. To that end, the cap nut has the clamping surface, which cooperates with the clamping elements. The clamping surface can preferably be in the form of a wedge acting surface, for example, a conical or rounded inner surface, and effect a radially inwardly directed movement of the clamping elements when the cap nut, in the course of the screwing process, moves axially in the direction towards the clamping elements, that is to say, optionally away from the fastening flange. It is thereby to be understood that the cap nut has the axial opening at the end, in order to allow the cable, which is clamped and sealed in the cable gland, to be guided through. A hollow space of the cap nut can preferably have a maximum diameter at the axial opening, which diameter decreases in the direction of the locking means, preferably of the internal thread, of the cap nut, in order to permit clamping of the clamping elements in the second position.

Preferably, the clamping elements can have at least one portion which is less rigid, preferably more resilient, in order to permit a movement, preferably tilting, of the clamping elements from the first position into the second position.

In particular, it is preferred that the clamping elements extend from the body element, and a hinge portion is formed between the clamping elements and the body element, and the clamping elements, starting from the hinge portion, extend radially outwards in the first position and can be tilted radially inwards by means of the hinge portion. The hinge portions can preferably be more resilient and/or less rigid than the clamping elements. As a result, the clamping elements can more easily be tilted, and installation can thus be facilitated. The more resilient form of the hinge portions can be achieved, for example, by material thinning, preferably a film hinge, or a more resilient material in the region of the hinge portion. It can thereby be achieved that the clamping elements and the body element are more rigid than the hinge portion, and consequently the hinge portion considerably facilitates a relative movement between the clamping elements and the body element. At the same time, reliable clamping with a defined clamping force can be achieved by the greater rigidity of the clamping elements and of the body element in relation to the hinge portion. As a result of this form, different cables with different diameters can preferably be reliably clamped by a cable gland. Stocking of different cable glands can thus be kept low.

The more resilient and/or less rigid form of the hinge portion preferably results in the clamping elements being more easily movable relative to the body element. For this reason, tilting of the clamping elements can be performed by the clamping surface with a relatively steep wedge or cone angle, since a high clamping force is not required to move the clamping elements. By means of this steep wedge or cone angle it is possible to bring the clamping elements from the first position into the second position, which defines a considerably smaller inside diameter as compared therewith, in that the cap nut from the first position via a short path in relation to that change in diameter into the second position the installation and strain relief of the cable in the cable gland according to the invention is thereby simplified considerably.

According to a further preferred development, it is provided that the body element has an axially extending fastening region with a fastening nut which is mechanically coupled with the fastening region and is movable from a first position on the fastening region into a second position on the fastening region, wherein the fastening nut is formed from the second material. As a result of this form, a cable gland having a body element, a clamping portion, a cap nut, and a fastening nut can be integrally produced, and the manufacturing costs can thereby be reduced further.

A fastening nut can preferably be understood as being an element which is in the form of a hollow body and has locking means, preferably friction-based and/or interlocking locking means, on an inner circumference. The locking means can preferably be configured to lock the fastening nut on the fastening region by an interlocking and/or friction-based connection. The locking means can preferably be in the form of an internal thread and/or a latching means and/or the like. The term fastening nut is not to imply a limitation to an element that is configured only for screwing.

Such a fastening region with a fastening nut permits secure anchoring of the cable gland in the wall opening. There can preferably be provided a screw connection which acts against the flange.

The fastening region can preferably comprise interlocking and/or friction-based locking means which are configured to lock the fastening nut on the fastening region in a second position by an interlocking and/or friction-based connection.

In particular, it is preferred that the fastening region has an external thread which is brought into engagement with an internal thread of the fastening nut, wherein the internal thread of the fastening nut is connected in the second position to the external thread of the fastening region by an interlocking and/or friction-based connection. Reliable anchoring in the wall opening can thereby be achieved.

Preferably, a portion of the fastening region can have an outer side which serves to shape an inner side of the fastening nut, or the fastening nut can have an inner side which serves to shape an outer side of a portion of the fastening region. According to this development, a first component, that is to say, the body element with the fastening region or the fastening nut, can be injection moulded first, and its form, in particular, its shaping, can be used to form, in particular, shape, a second component, that is to say, correspondingly the fastening nut or the body element with the fastening region. By injection moulding the second component onto the first component, the second component can be manufactured corresponding to the shape of the first component. A particularly accurately fitting connection between these components can thereby preferably be achieved.

For further advantages, implementation variants, and implementation details of the form of the fastening nut on the fastening region, reference may also be made to the description given above of the form of the cap nut on the body element.

According to a second aspect of the present invention, the object mentioned at the beginning is achieved by a method for producing a cable gland, comprising the following steps: injection moulding a body element having an internal cable duct, injection moulding a cap nut from a second material onto the body element and the clamping portion, and preferably injection moulding a clamping portion arranged on the body element and having clamping elements from the first or the second material, and preferably connecting a sealing portion to the body element in the cable duct.

Particularly preferably, the method for producing a cable gland can comprise the following steps: injection moulding a body element having an internal cable duct and a clamping portion arranged on the body element and having clamping elements from a first material, connecting a sealing portion to the body element in the cable duct, and injection moulding a cap nut from a second material onto the body element and the clamping portion.

According to a third aspect of the present invention, the object mentioned at the beginning is achieved by a method for producing a cable gland comprising the following steps: injection moulding a cap nut from a second material, injection moulding a body element having an internal cable duct from a first material on to the cap nut, and preferably injection moulding a clamping portion arranged on the body element and having clamping elements from the first or second material, and preferably connecting a sealing portion to the body element in the cable duct.

Particularly preferably, the method for producing a cable gland can comprise the following steps: injection moulding a cap nut from a second material, injection moulding onto the cap nut a body element having an internal cable duct, and a clamping portion arranged on the body element and having clamping elements from a first material, and connecting a sealing portion to the body element in the cable duct.

Preferably, the second aspect and/or the third aspect can comprise the following step: injection moulding a sealing portion from a third material onto the body element in the cable duct.

Particularly preferably, the second aspect and/or the third aspect can comprise the following step: injection moulding a fastening nut onto a fastening region of the body element from the second material.

Preferably, the fastening nut and the cap nut can be injection moulded onto the body element at the same time or injection moulded at the same time. As a result, time and thus manufacturing costs can additionally be reduced.

The methods according to the second and/or the third aspect of the invention can further comprise the following step: separating the cap nut and the body element from one another, preferably producing play at a connection between the cap nut and the body element. This can preferably take place by a shrinkage process, in particular, cooling of the first material and/or of the second material.

For further advantages, implementation variants, and implementation details of these further aspects and their possible developments, reference may also be made to the description given above of the corresponding features and developments.

BRIEF DESCRIPTION OF THE DRAWINGS

Preferred exemplary embodiments will be explained by way of example with reference to the accompanying figures, in which.

DETAILED DESCRIPTION OF THE EMBODIMENTS

In the Figures, elements which are the same or have substantially the same or similar functions are denoted by the same reference numerals.

Figure 1:
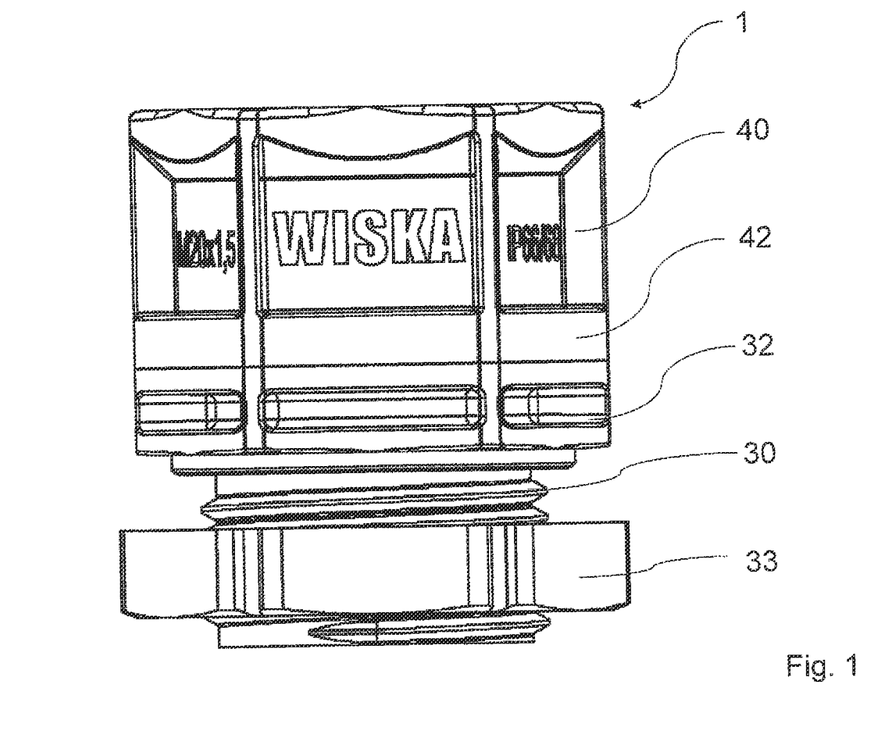
FIG. 1 is a cable gland in a pre-assembled state.
Figure 2:
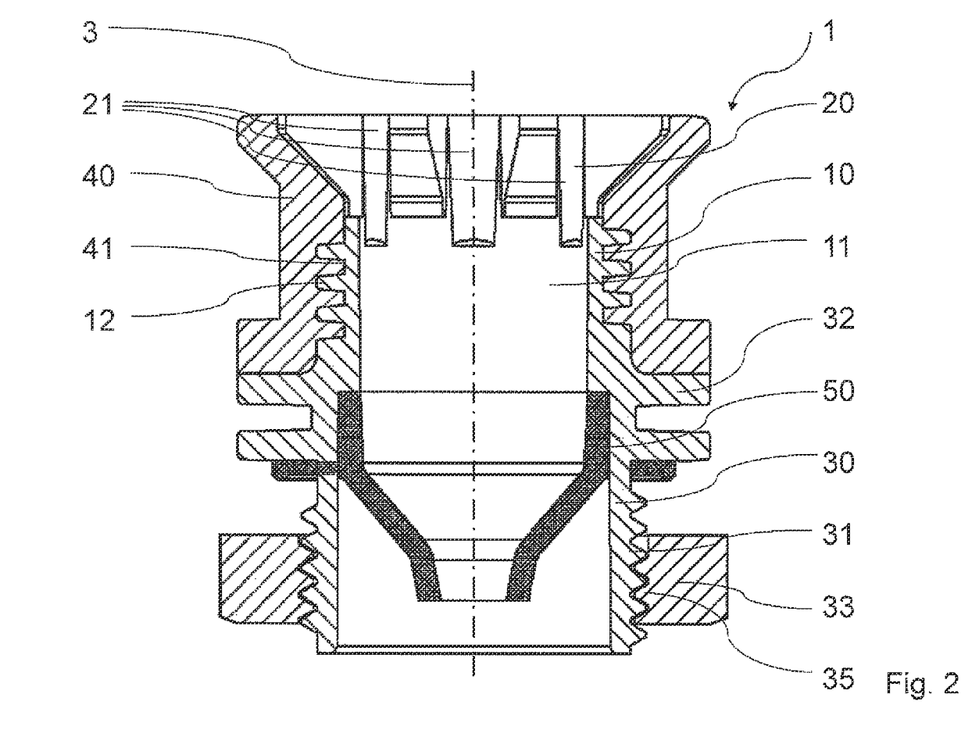
FIG. 2 is a sectional view of the cable gland in the pre-assembled state according to FIG. 1.

Referring first to FIGS. 1 and 2, a cable gland 1 is depicted in a state in which the cable gland is removed from a tool after the injection moulding operation. A cap nut 40 is thereby injection moulded onto a body element 10 and is movable relative to the body element 10. Consequently, this is a pre-assembled state—without pre-assembly as such taking place. Instead, the operation of pre-assembly is integral with the moulding operation, that is to say, manufacture of the parts by injection moulding. In the pre-assembled state, a cap nut 40 is arranged on the body element 10 and fastened thereto, so that the clamping elements 21 of a clamping portion 20, which is arranged on the body element 10, are in a relaxed state. In the relaxed state of the clamping elements 21, they are in a first position in which they delimit a first inside diameter. In this first position, the clamping elements 21 do not produce a clamping action.

FIG. 1 shows the cable gland 1 having a cap nut 40 which is so arranged on the body element 10 that it rests on a fastening flange 32. The body element 10 has a fastening region 30, on which a fastening nut 33 is arranged.

According to the present invention, the cable gland 1 is preferably produced integrally in the pre-assembled state. As a result, the cable gland 1 can be made available and marketed in the pre-assembled state, without additional components of the cable gland 1 having to be manually assembled.

FIG. 2 is a sectional view of the cable gland 1 according to FIG. 1. This sectional view shows the body element 10 with a clamping portion 20, which has clamping elements 21. In this pre-assembled state, the clamping elements 21 are in a position which represents a radially outward extent in the axial direction. In addition, the body element 10 has a fastening region 30, on which the fastening nut 33 is arranged. The body element 10 further comprises the fastening flange 32 on which there rests the cap nut 40, which is arranged on the body element 10.

The cap nut 40 has an internal thread 41 which is brought into engagement with an external thread 12 of the body element 10. The fastening region 30 of the body element 10 also has an external thread 31, which is brought into engagement with an internal thread 35 of the fastening nut 33.

The body element 10 is in the form of a hollow body and has an internal cable duct 11. In this cable duct 11 there extends a longitudinal axis 3 of the cable gland 1. Furthermore, a sealing element 50 is arranged in the cable duct 11.

The body element 10 having the fastening region 30 is formed integrally with the clamping portion 20 and rotationally symmetrically along the longitudinal axis 3. The sealing element 50 is also formed rotationally symmetrically along the longitudinal axis 3 and connected to the body element 10. The sealing element 50 extends in the cable duct 11 and has a geometry which permits sealing of a cable introduced into the cable duct 11. To this end, a first end of the sealing element 50 rests on the body element 10 and has a maximum diameter at that first end. The diameter of the sealing element 50 becomes smaller from the first end to a second end of the sealing element 50. The sealing element 50 has a minimal diameter at the second end. In order to achieve secure sealing, this minimal diameter must be smaller than a diameter of a cable that is to be introduced. As a result of a preferred form of the sealing element 50 of a resilient material, different cables with different diameters can reliably be sealed. A portion of the sealing element 50 additionally projects from the body element 10. This portion of the sealing element 50 forms a sealing flange, which rests on the fastening flange 32. The body element 10, therefore, has openings which are preferably formed along the circumference of the body element 10, through which the sealing element 50, or parts thereof, are guided. For example, the sealing element 50 can be fastened to the body element 10 by the parts that are guided through those openings. Alternatively, the sealing element 50 can also be connected to the body element 10, for example, by a material-bonded connection.

Figure 3:
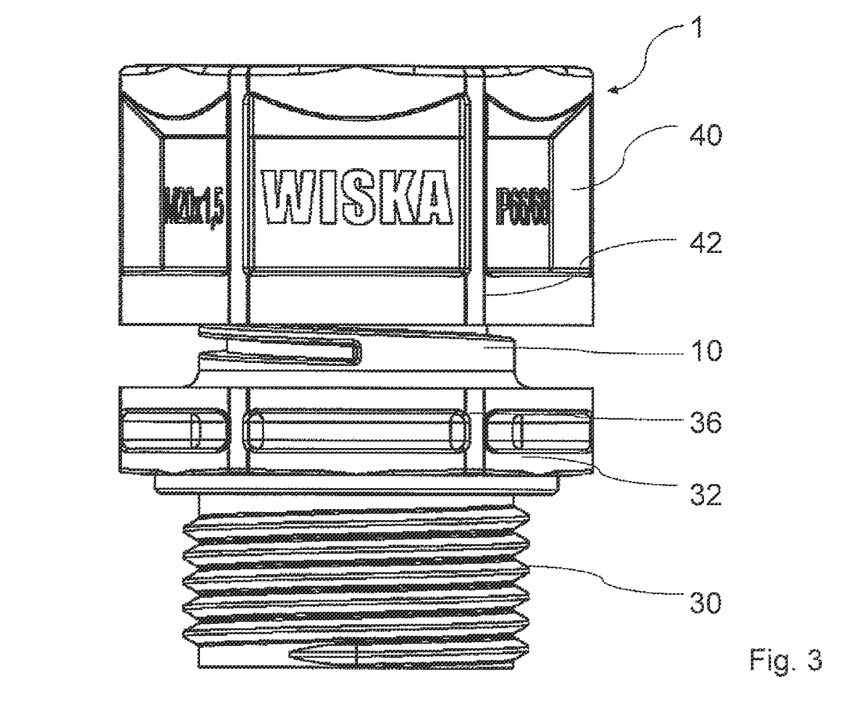
FIG. 3 is the cable gland according to FIG. 1 in an installed state.
Figure 4:
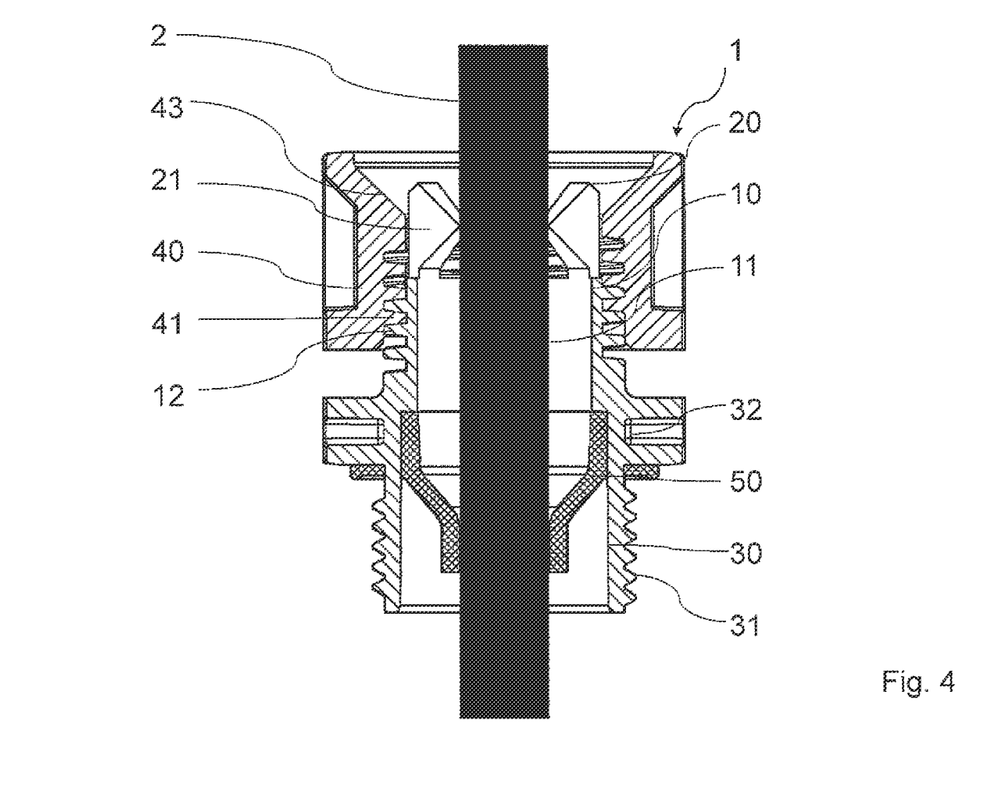
FIG. 4 is a sectional view of the cable gland in the installed state according to FIG. 3.

Referring to FIGS. 3 and 4, a cable gland 1 is shown in an installed state. These Figures accordingly show the functioning of the cable gland 1. In the installed state, the cap nut 40 is connected by an interlocking and/or friction-based connection to the body element 10. The cap nut 40 is thereby in the second position, wherein the clamping elements 21 of the clamping portion 20 are thereby moved, preferably tilted, from the first position, the relaxed position, into the second position. In the second position, the clamping elements 21 delimit a second inside diameter which is smaller than the first inside diameter, and thereby produce a clamping action.

The body element 10 additionally has the fastening flange 32 and the fastening region 30. In the pre-assembled state shown here, the cap nut 40 is arranged spaced apart from the fastening flange 32 and is connected to the body element 10.

The cap nut 40 has an outer surface which is in the form of a multi-sided outer surface 42, in order to be able to apply a torque by means of a tool. The cap nut 40 can thereby be screwed simply from the first position into the second position on the body element 10.

The fastening flange 32 also has an outer surface which is in the form of a multi-sided outer surface 36. This fastening flange 32 is formed between the portion of the body element 10 on which the cap nut 40 is arranged and is movable from the first position into the second position, and the fastening region 30. The multi-sided outer surface 36 permits counter-holding on tightening of cap nut 40 as well as on tightening of the fastening nut or of a screw on an external thread 31 of the fastening region 30 on fastening of the cable gland 1 in a wall opening. This fastening can take place by introducing the end of the cable lead-through 1 located on the side of the external thread 31 of the fastening region 30 as far as the stop on the flange 32 and tightening the fastening nut 33 on the external thread 31.

FIG. 4 shows the cable gland 1 with a cable 2 introduced in the cable duct 11, which cable is clamped, relieved of strain, and sealed within the cable gland 1. This Figure thus shows the cable gland 1 in a clamped installed situation.

The cable 2 has a diameter which is larger than the minimal diameter of the sealing element 50. Therefore, the sealing element 50 is expanded at least in the region of the minimal diameter on account of the cable 2 guided through the sealing element 50. It is clear that the minimal diameter of the sealing element 50, according to FIG. 2, is now increased. The sealing element 50 is thereby pressed against the wall of the cable 2, so that the cable 2 arranged in the cable duct 11 is sealed.

The cap nut 40 has an inner clamping surface 43, which in FIG. 4 is conical in form. The clamping surface 43 extends from an axial opening at one end of the cap nut 40 in the direction towards the portion of the cap nut 40 which has the internal thread 41 of the cap nut 40. The clamping surface 43 is in conically converging form, starting from the axial opening. This means that an inside diameter of the cap nut 40 becomes smaller starting from the axial opening in the direction towards the portion of the cap nut 40 which has the internal thread 41. Outer surfaces of the clamping elements 21 thereby rest on the clamping surface 43. Preferably, the cap nut 40 has a minimal inside diameter in the portion that has the internal thread 41. In the example shown here, the clamping elements 21 are tilted into the second position, wherein the inside diameter, which is delimited in this position by the clamping elements 21, is a minimal possible inside diameter. This means that a cable 2 having a diameter which represents a minimal cable diameter which can be clamped by this cable gland shown by way of example is clamped. In this installed state, the clamping elements 21 are in a position which represents an extent in the axial direction. As can be seen, the clamping elements 21 are tilted by the clamping surface 43. As a result of the reduced inside diameter, which is delimited by the clamping elements 21, the cable 2 is radially clamped and secured against axial movements, that is to say, is relieved of strain.

According to this embodiment, the clamping elements 21 are in the form of individual webs having a radial thickened portion. These clamping elements 21 additionally have a hinge portion which is formed between the clamping elements 21 and the body element 10 and permits tilting of the clamping elements 21.

Also according to the form of the cable gland 1 in FIG. 4, the body element 10 has an external thread 12 which is brought into engagement with an internal thread 41 of the cap nut 40. The external thread 12 is connected by an interlocking and/or friction-based connection to the internal thread 41 and thereby fastens the cap nut 40 in the second position on the body element 10. The fastening region 30 has the external thread 31, which is configured to fasten the cable gland 1 in the wall opening.

FIGS. 5-8 show an example of a process for manufacturing the cable gland in individual steps.

Figure 5:
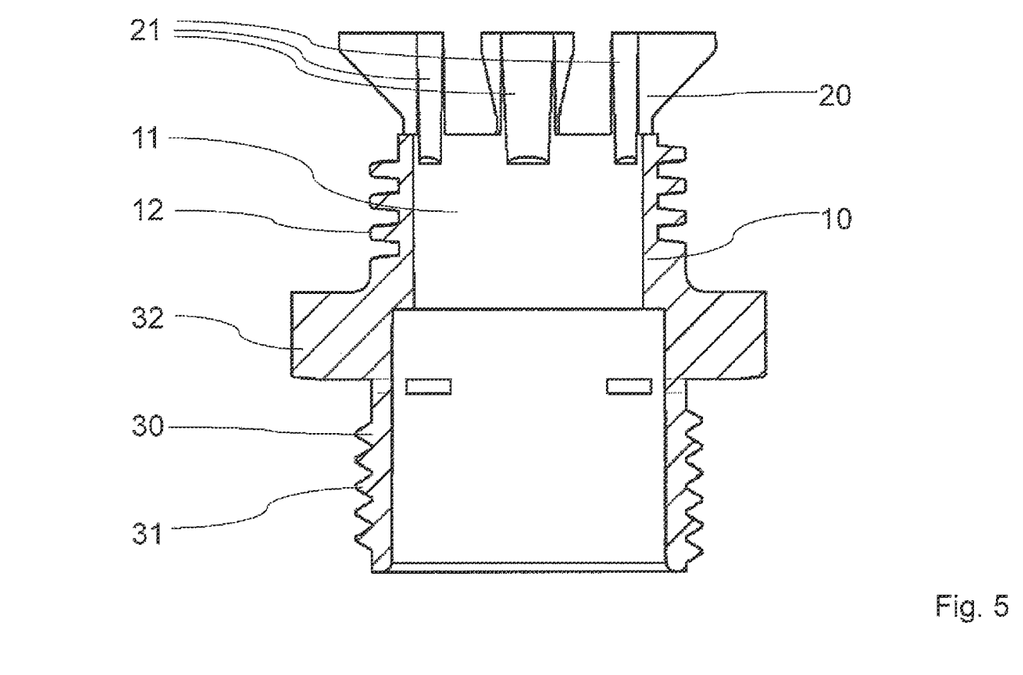
FIG. 5 is a sectional view of a body element having a clamping portion.

In a first step according to FIG. 5 of the manufacturing process, shown here by way of example, the body element 10 with a clamping portion 20 arranged thereon, which has individual clamping elements 21, a fastening flange 32, and a fastening region 30 is injection moulded from a first material. The body element 10 is thereby in the form of a hollow body having an inner cable duct 11. In this first step, an external thread 12 is formed on a portion of the body element 10. Correspondingly, an external thread 31 is also formed on the fastening region 30.

Figure 6:
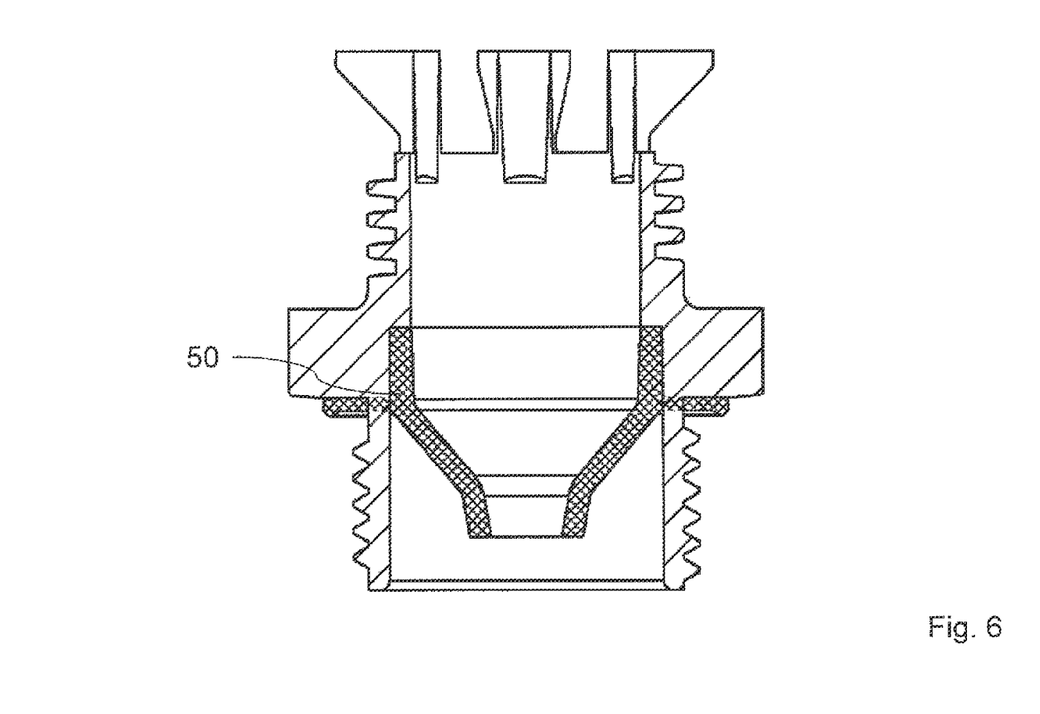
FIG. 6 is a sectional view of a body element having a clamping portion and of a sealing element.

In a second step according to FIG. 6 of the manufacturing process shown here by way of example, the sealing element 50 is arranged in the cable duct 11 and connected to the body element 10 injection moulded in the first step according to FIG. 5. Preferably, the sealing element 50 is injection moulded from a third material on to the body element 10 and thereby connected by a material-bonded connection to the body element 10.

Figure 7:
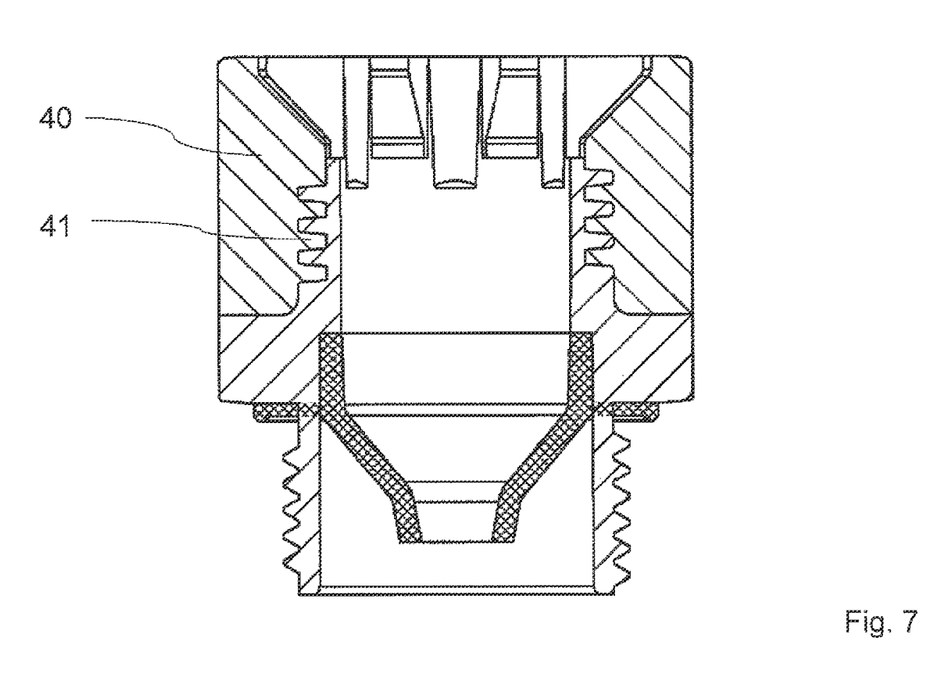
FIG. 7 is a sectional view of a body element having a clamping portion, of a sealing element and of a cap nut.

In a third step according to FIG. 7 of the manufacturing process shown here by way of example, the outer side of the body element 10 having the clamping portion 20 injection moulded in the first step according to FIG. 5, that is to say, the outer contours, in particular, the external thread 12, is used as shaping elements for the cap nut 40. In this third step, the cap nut 40 is injection moulded from a second material on to the body element 10 and the clamping portion 20 in the first position, in which the cap nut 40 rests on the fastening flange 32 and the clamping elements 21 are in a relaxed state, that is to say, an unclamped state. As a result of the shaping elements, in particular the external thread 12 and/or the clamping elements 21, an inner side, preferably the internal thread 41, of the cap nut 40 can hereby be formed.

Figure 8:
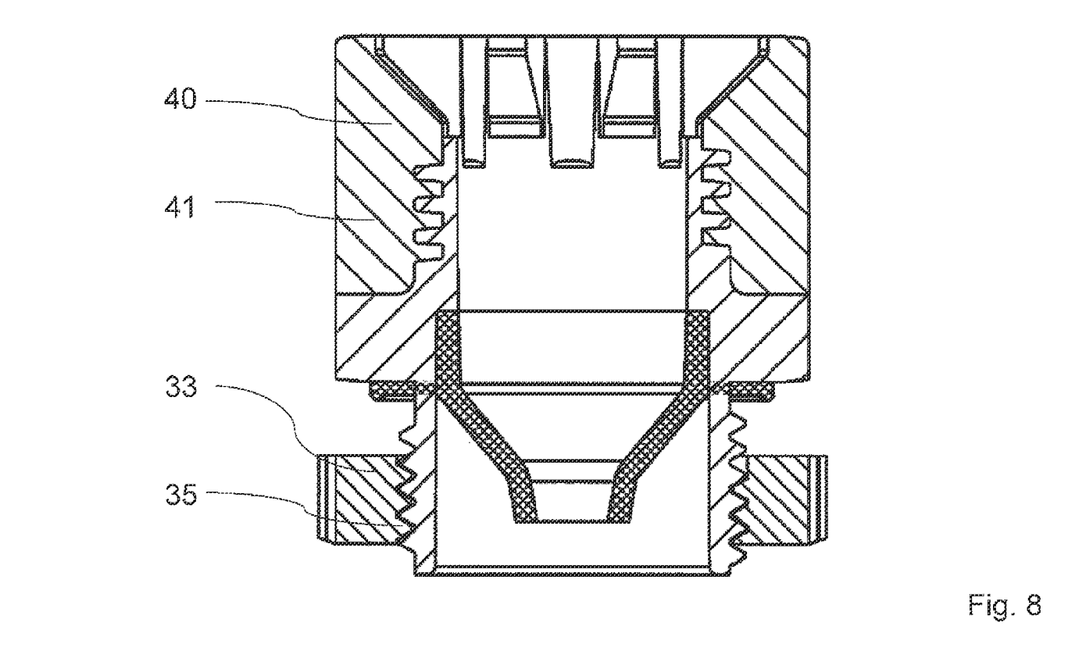
FIG. 8 is a sectional view of a body element having a clamping portion and a fastening region, of a sealing element, of a cap nut and of a fastening nut.

In an alternative third step according to FIG. 8 of the manufacturing process shown here by way of example, the outer side of the body element 10 having the clamping portion 20 and the fastening region 30 injection moulded in the first step according to FIG. 5, that is to say, the outer contours, in particular the external thread 12, the clamping elements 21 and the external thread 31, is used as shaping elements for the cap nut 40 and the fastening nut 33. In this third step, the cap nut 40 is injection moulded on to the body element 10 having the clamping portion 20 and the fastening nut 33 on the fastening region 30 of the body element 10. The cap nut 40 is thereby also injection moulded in the first position, in which the cap nut 40 rests on the fastening flange 32 and the clamping elements 21 are in the relaxed state, that is to say, the unclamped state. As a result of the shaping elements, in particular, the external thread 12, the clamping elements 21, and the external thread 31, an inner side, preferably the internal thread 41, of the cap nut 40 as well as the internal thread 35 of the fastening nut 33 can thereby be formed.

Alternatively, it is also possible first to injection mould the cap nut 40 onto the body element 10 having the clamping portion 20 in a third step according to FIG. 7 and then, in a fourth step, to injection mould the fastening nut 33 on to the fastening region 30 of the body element 10 according to FIG. 8.

I claim:

1. A method for producing a pre-assembled cable gland for guiding a cable through a wall opening, comprising the steps of:
   injection moulding a body element extending along a longitudinal axis and having an internal cable duct from a first material;
   injection moulding a cap nut from a second material onto the body element; and
   injection moulding a clamping portion arranged on the body element and having clamping elements from the first or the second material.

2. The method according to claim 1, further comprising the step of:
   connecting a sealing portion to the body element in the cable duct, in which the connection of the sealing portion to the body element is effected by injection moulding the sealing portion from a third material on to the body element in the cable duct.

3. The method according to claim 1, further comprising the step of:
   injection moulding a fastening nut on to a fastening region of the body element from the second material.

4. A method for producing a cable gland, comprising the steps:
   injection moulding a cap nut from a second material,
   injection moulding a body element having an internal cable duct from a first material on to the cap nut; and injection moulding a clamping portion arranged on the body element and having clamping elements from the first or second material.

5. The method according to claim 4, further comprising the step of:
   connecting a sealing portion to the body element in the cable duct, in which the connection of the sealing portion to the body element is effected by injection moulding the sealing portion from a third material on to the body element in the cable duct.

6. The method according to claim 4, further comprising the step of:
   injection moulding a fastening nut onto a fastening region of the body element from the second material.

7. A method for producing a pre-assembled integrally produced cable gland for guiding a cable through a wall opening, the method comprising the steps of:
   injection moulding a body element extending along a longitudinal axis and having an internal cable duct extending along the longitudinal axis;
   injection moulding a clamping portion having a plurality of clamping elements movable from a first position, in which the clamping elements delimit a first inside diameter, into a second position, in which the clamping elements delimit a second inside diameter which is different from the first inside diameter, and wherein the clamping portion is arranged on the injection moulded body element; and
   injection moulding a cap nut having an axial opening at one end mechanically coupled with the body element, wherein the cap nut is movable from a first position on the body element into a second position on the body element;
   wherein the body element comprises a first material and the cap nut comprises a second material and wherein a surface geometry of the body element exactly corresponds to an inverse surface geometry of the cap nut and the first material and the second material are injection moulded relative one another.

8. The method according to claim 7, wherein the second inside diameter is smaller than the first inside diameter.

9. The method according to claim 7, wherein the first material has a first shrinkage and the second material has a second shrinkage that is less than the first shrinkage.

10. The method according to claim 7, wherein play occurs at a connection between the cap nut and the body element.

11. The method according to claim 7, further comprising the step of connecting a tubular sealing element arranged inside the cable duct on the body element.

12. The method according to claim 11, wherein the sealing element is formed from a third material.

13. The method according to claim 12, wherein the third material has a lower modulus of elasticity than the first material or the second material.

14. The method according to claim 11, further comprising the step of injection moulding the sealing element on to the body element.

15. The method according to claim 11, wherein the sealing element is connected to the body element by a material-bonded connection.

16. The method according to claim 7, wherein a portion of the body element has an outer side which serves to shape an inner side of a portion of the cap nut.

17. The method according to claim 7, wherein a portion of the cap nut has an inner side which serves to shape an outer side of a portion of the body element.

18. The method according to claim 16, wherein a portion of the outer side of the body element is in the form of an external thread and a portion of the inner side of the cap nut is in the form of an internal thread;
   wherein the external thread of the body element and the internal thread of the cap nut are brought into engagement; and
   wherein the internal thread of the cap nut is connected in the second position to the external thread of the body element by an interlocking or friction-based connection.

19. The method according to claim 18, wherein the internal thread of the cap nut is left-handed.

20. The method according to claim 7, wherein the body element has a fastening flange;
   wherein the cap nut in the first position rests on the fastening flange and is movable away from the fastening flange from the first position into the second position;
   wherein the cap nut has a clamping surface which cooperates with the clamping elements and in the second position presses the clamping elements into the second position; and
   wherein the clamping elements in the second position delimit the second inside diameter, which is smaller than the first inside diameter.

21. The method according claim 7, wherein the clamping elements extend from the body element, and a hinge portion is formed between the clamping elements and the body element; and
   wherein the clamping elements, starting from the hinge portion, extend radially outwards in the first position and are adapted to tilt radially inwards by means of the hinge portion.

22. The method according to claim 7, wherein the body element has an axially extending fastening region with an fastening nut mechanically coupled with the fastening region and movable from a first position on the fastening region into a second position on the fastening region; and
   wherein the fastening nut is formed from the second material and wherein the surface geometry of the body element exactly corresponds to an inverse surface geometry of the fastening nut.

23. The method according to claim 22, wherein the fastening region has an external thread which is brought into engagement with an internal thread of the fastening nut; and
   wherein the internal thread of the fastening nut is connected in the second position to the external thread of the fastening region by an interlocking or friction-based connection.

\* \* \* \* \*